United States Patent [19]

Bunick et al.

[11] Patent Number: 5,021,249
[45] Date of Patent: Jun. 4, 1991

[54] METHOD OF MAKING A SAVORY FLAVOR GRANULE AND A FREE FLOWING SAVORY FLAVOR GRANULE

[75] Inventors: Frank J. Bunick, Budd Lake; Shiuh J. Luo, Morris Plains; James J. Shaw, Morristown; Stephen R. Hellman, Mt. Tabor, all of N.J.

[73] Assignee: Warner-Lambert Company, Morris Plains, N.J.

[21] Appl. No.: 433,873

[22] Filed: Nov. 9, 1989

[51] Int. Cl.$^5$ .................................................. A23L 1/22
[52] U.S. Cl. ........................................ 426/96; 426/289
[58] Field of Search ................... 426/98, 96, 97, 103, 426/99, 591, 648, 649, 289, 295; 264/7

[56] References Cited

U.S. PATENT DOCUMENTS

| | | | |
|---|---|---|---|
| 3,850,838 | 11/1974 | Guckenberger | 426/103 |
| 3,974,032 | 8/1976 | Harjes | 426/658 |
| 4,382,963 | 5/1983 | Klose | 426/658 |
| 4,544,565 | 10/1985 | Barnett | 426/658 |
| 4,556,566 | 12/1985 | Bell | 426/649 |
| 4,567,053 | 1/1986 | Lindley | 426/658 |
| 4,585,657 | 4/1986 | Karwowski | 426/285 |
| 4,692,340 | 9/1987 | Grutte | 426/103 |
| 4,738,865 | 4/1988 | Morris | 426/658 |
| 4,741,910 | 5/1988 | Karwowski | 426/285 |
| 4,844,921 | 7/1989 | Bakal | 426/98 |
| 4,910,031 | 3/1990 | Budd | 426/102 |

FOREIGN PATENT DOCUMENTS 2157148 10/1985 United Kingdom .
2180534 4/1987 United Kingdom .

*Primary Examiner*—Carolyn Paden
*Attorney, Agent, or Firm*—Craig M. Bell

[57] ABSTRACT

A free-flowing savory flavor granule which comprises a core composition comprising a nonsweet carbohydrate and a coating on the core comprising savory flavor.

42 Claims, No Drawings

METHOD OF MAKING A SAVORY FLAVOR GRANULE AND A FREE FLOWING SAVORY FLAVOR GRANULE

BACKGROUND OF THE INVENTION

1. Field of the Invention

This invention relates to a free-flowing flavored granule, and method of using and producing the same, and more particularly to a flavored granule prepared using a nonsweet carbohydrate bulking agent. A particularly preferred aspect of the invention employs sucrose and a sweetness inhibitor to prepare a bulking agent used to make the flavored granule.

2. Description of the Related Art

The use of sweet carbohydrates in foods as fillers or bulking agents is well established. However, above certain concentration levels, the sweetness of these carbohydrates becomes excessive. This excessive sweetness, which is not taste compatible with savory flavors among others, can also mask desirable flavors.

Japanese patent 57,071,366 to Nobel discloses hard confectioneries with low sweetness. The confectioneries contain (1) 0–70% lactose, (2) 0–60% of a sugar selected from the group consisting of glucose, fructose, sorbitol, maltitol, isomerized sugar and honey, and (3) the remainder malt syrup and/or dextrin. Sweetness is said to be controlled by appropriate selection of the sugar or by addition of the nonnutritive sweetener agent Stevioside. Nobel further states that savory flavors, not compatible with conventional compositions, may be combined with low sweetness compositions.

Japanese patent 61,254,148 to Ishi discloses low caloric candy compositions which consist of (1) polydextrose, (2) sugar alcohols such as sorbitol, maltitol, xylitol, and mannitol, and (3) a flavoring agent.

Herzing U.S. Pat. No. 4,562,079 discloses savory confection-like coatings for snack foods. The savory coatings consist of (1) matrix of hard butter, (2) a flavoring agent, and (3) a particulate base material mixed in the hard butter matrix composed of bland carbohydrate and/or protein components.

The use of sweet and nonsweet carbohydrate bulking agents in the preparation of savory flavored products that may contain optimal additions including salt products is disclosed in two copending applications of the present assignee. These applications are U.S. Ser. No. 222,479 filed on July 21, 1988 and entitled "Savory Flavored Nonsweet Compositions Using Sweet Carbohydrate Bulking Agent" which is now abandoned and U.S. Ser. No. 222,599 filed on July 21, 1988 and entitled "Savory Flavored Nonsweet Compositions Using Nonsweet Carbohydrate Bulking Agent" which is now abandoned. The inventions described in these applications relate to savory flavored products and not to flavored granules which are designed to replace conventional flavors, such as powdered spices and seasonings.

Accordingly, there remains a need for a flavored product which reduces the amount of flavor used to make the product without changing the manner of applying the flavor and which has granules which taste similar to conventional flavor, yet contain less flavor content. Such a product should not change the organoleptic properties expected from the flavor, nor its manner of use, such as shaking, dipping or licking and so forth.

SUMMARY OF THE INVENTION

Applicants have unexpectedly discovered a free-flowing flavored granule which comprises: (a) a core composition comprising a nonsweet carbohydrate bulking agent; and (b) a coating on the core comprising the flavor. The term coating as used herein refers to a flavorant (spice or seasoning) which is fused, agglomerated or spray coated on the bulking agent. The nonsweet carbohydrate bulking agent may be selected from the group consisting of nonsweet or low sweet hydrogenated starch hydrolysates, polymers of glucose, and other carbohydrates such as gum arabic, and other hydrocolloid gums, and mixtures thereof. In addition, the non-sweet carbohydrate bulking agent may be composed of a sweet carbohydrate bulking agent and a sweetness inhibiting agent to nullify the sweetness of the bulking agent. Particularly preferred sweetener inhibitors are 2-p-methoxyphenoxypropionic acid, p-methoxybenzylacetic acid, and mixtures thereof.

A particularly preferred feature of the invention involves use of sucrose with a sweetener inhibitor as the bulking agent to prepare a savory flavored granule simulating conventional flavoring, spices and seasonings. The use of such bulking agents enables a reduction in flavor content from 25 to 75% in the final granule which granule still retains its flavor impact, texture, shakeability, ability to cling to food, organoleptic taste and flavor enhancement capacity.

The free-flowing savory flavored granules of the present invention are preferably prepared by a) forming a core particle comprising a particulate non-sweet carbohydrate bulking agent having a particle size of less than about 60 mesh, U.S. standard sieve size; (b) admixing a powdered savory flavor therewith to form a coated core; and (c) recovering an agglomerated free-flowing savory flavored granule.

In an alternate procedure, the granules are prepared by (a) forming a core particle comprising a particulate nonsweet carbohydrate bulking agent having a particle size of less than about 60 mesh, U.S. standard sieve size; (b) spray coating the core particles with an organic solvent containing the savory flavor to coat the core particles; (c) drying the flavored coated particles and recovering a free-flowing savory flavored granule.

DESCRIPTION OF THE PREFERRED EMBODIMENTS

Applicants have unexpectedly discovered that compositions which taste like conventional savory flavors, spices and seasonings and which are delivered like conventional savory flavors, spices and seasonings may be prepared from nonsweet carbohydrate bulking agents and the savory flavors themselves. The compositions of the present invention are different from conventional savory flavors in that they contain from about 25% to about 75% less flavor per equivalent weight and yet they have the same organoleptic properties and physical properties of conventional savory flavor. This invention utilizes a nonsweet carbohydrate as a bulk replacer for the flavor particles normally present in spices and seasonings. By employing such nonsweet bulking agents the organoleptic properties of the flavor are not modified yet the savory flavor, feels and acts like real flavor particles when used with edible products. While the exact reason for this result is not known, it is believed to be attributable to surface area, that is by employing nonsweet particles which have an increased surface area which are then made into the savory flavored granules having an equivalent overall surface area to conventional flavor, it has been found that the resulting product has the same properties as conventional flavor, spices and seasonings when contacting the tongue. This reduction aids in reducing the cost for specialty flavors and flavors that are difficult to obtain while enabling the consumer to enjoy the benefit of the flavor as if it were the real thing.

The nonsweet carbohydrate bulking agents of the present invention must have a physical make-up to provide adequate bulk and texture to the composition. In addition, the carbohydrate bulking agents must contribute no sweetness or minimal sweetness to the composition. The sweet carbohydrate bulking agents of the present invention must have a physical make-up to provide adequate bulk and texture to the composition. Suitable sweet carbohydrate bulking agents include sugars, sugar alcohols, hydrogenated hexoses and pentoses, hydrogenated disaccharides, sweet hydrogenated starch hydrolysates and mixtures thereof.

Suitable sugar bulking agents include monosaccharides, disaccharides and polysaccharides such as sucrose, glucose, xylose, ribose, mannose, galactose, fructose, dextrose, maltose, partially hydrolyzed starch and corn syrup solids, and mixtures thereof, with sucrose being the preferred sweet bulking agent. A less preferred bulking agent is a mixture of sucrose and corn syrup solids. The weight ratio of sucrose to corn syrup solids is generally from about 0.5:1 to about 2:1, preferably from about 1:1 to about 2:1, and most preferably from about 1.3:1 to about 1.7:1.

Suitable sugar alcohol bulking agents include sorbitol, xylitol, mannitol, galactitol, maltitol, and mixtures thereof.

Suitable hydrogenated disaccharides include hydrogenated isomaltulose manufactured under the tradename PALATINIT by Palatinit Subungsmittel GMBH, and hydrogenated lactose manufactured under the trademark LACTITOL by C.C.A. Biochem b.v. LACTITOL and PALATINIT contain about half the calories of other sugar alcohols.

The hydrogenated starch hydrolysates employed herein may include those disclosed in reissue U.S. Pat. Nos. 25,959, 3,356,811, 4,279,931 and various hydrogenated glucose syrups and/or powders which contain sorbitol, hydrogenated disaccharides, hydrogenated higher polysaccharides, or mixtures thereof.

Hydrogenated starch hydrolysates are primarily prepared by the controlled catalytic hydrogenation of corn syrups. The resulting hydrogenated starch hydrolysates are mixtures of monomeric, dimeric, and polymeric saccharides. The ratios of these different saccharides give different hydrogenated starch hydrolysates different properties. The degree of polymerization (DP) of various hydrogenated starch hydrolysates is presented in Table 1.

Products high in percentages of monomer (DP1) and dimer (DP2) will have higher sweetness levels and produce softer and more hydroscopic confectionery products. Products high in percentages of polymers will have low sweetness and produce confectionery products that have a hard texture. DP-1, for example could stand for sorbitol, mannitol, xylitol or any other hydrogenated monosaccharide. DP-1 is generally sorbitol due to the natural abundance of glucose in the corn syrup starting material. Similarly, the percent DP-2 defines the amount of hydrogenated disaccharides such as maltitol present while DP-3, DP-4, DP-5 . . . and so on define the amounts of higher hydrogenated saccharides present in the hydrogenated starch hydrolysate.

Preferably the hydrogenated starch hydrolysates used in the present invention will have a DP-1 value from about 5% to about 15%, a DP-2 value from about 15% to about 65%, and a DP-3 and DP-4 value from about 30% to about 70%.

Suitable sweetness inhibiting agents include those compounds disclosed in United Kingdom Patent Application 2,157,148, and U.S. Pat. No. 4,567,053, both of which are incorporated herein by reference. The preferred sweetness inhibiting agents disclosed comprise two related series of compounds which are ethers or thioethers of acetic acid derivatives. The sweetness inhibiting compounds have the general formula:

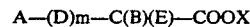

A—(D)m—C(B)(E)—COOX where m represents 0 or 1; A represents a homocyclic or heterocyclic aromatic group; B represents hydrogen, a 1–3 carbon aliphatic group or phenyl; or, when m represents 0, A and B complete a homocyclic or heterocyclic aromatic group, or a methylene group substituted by a homocyclic or heterocyclic aromatic group; E represents hydrogen or alkyl or; when m represents O, hydroxy or alkoxy; D represents oxygen or sulfur; X represents hydrogen or a physiologically compatible cation, with the provision that m represents 1 when A represents phenyl and B and C both represent hydrogen; or when A represents unsubstituted phenyl, B represents alkyl and C represents hydrogen.

Other suitable sweetness inhibiting agents include the salts of substituted benzoylalkyl carboxylic acids disclosed in U.S. Pat. No. 4,544,565, which patent is incorporated herein by reference. These sweetness inhibiting agents have the general formula:

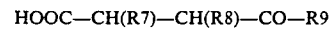

HOOC—CH(R7)—CH(R8)—CO—R9 wherein R7 is hydrogen or C1–C3 alkyl, R8 is hydrogen or C1–C3 alkyl, and R9 represents a penta-substituted phenyl group the substituents of which are independently selected from the group consisting of hydrogen, C1–C3 alkyl, C1–C3 alkoxy, C1–C2 hydroxyalkyl, hydroxy and carboxy.

Other suitable sweetness inhibiting agents include 3-aminobenzenesulfonic acid and derivatives thereof disclosed in U.S. Pat. No. 4,642,240, which patent is incorporated herein by reference.

Other suitable sweetness inhibiting agents include the substituted phenylalkyl carboxylic acid salts and substituted phenyl ketoalkyl carboxylic acid salts disclosed in U.S. Pat. No. 4,567,053, which patent is incorporated herein by reference. These sweetness inhibiting agents have the general formula:

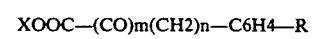

XOOC—(CO)m(CH2)n—C6H4—R where m represents 0 or 1, and when m represents 0, n represents 1, 2 or 3 and p represents 1, 2, 3, or 4, and when m represents 1, n represents 1 or 2 and p represents 0, 1, 2, 3 or 4; the substituents R individually represent a lower alkoxy group, phenoxy group or a lower alkyl or trifluoromethyl group; two substituents R together represent an aliphatic chain linked to the phenyl ring at two positions, or one substituent R represents a hydroxy group while at least one other substituent R represents an alkoxy group and X is a physiologically acceptable cation.

Other suitable sweetness inhibiting agents include the substituted benzoyloxy acetic and 2-propionic acid salt derivatives disclosed in United Kingdom Patent Application 2,180,534, which application is incorporated herein by reference. These sweetness inhibiting agents have the general formula:

R1—C6H4—COOH wherein R1 is hydroxy or alkoxy containing 1 to 4 carbons, and R1 and an adjacent R2 together form a methylenedioxy ring; each R2 individually is selected from the group consisting of hydrogen, alkyl containing 1 to 3 carbons, alkoxy containing up to 2 carbons, hydroxy and carboxymethoxy group with the provision that when R2 individually is a functional group of alkyl, alkoxy, hydroxy or carboxymethoxy, the number of functional groups will not exceed two; and R3 is hydrogen or methyl.

Preferred sweetness inhibiting agents are 2-p-methoxyphenoxypropionic acid manufactured under the trademark LACTISOLE by Tate & Lyle and p-methoxybenzylacetic acid and mixtures thereof.

Suitable nonsweet carbohydrate bulking agents include nonsweet or low sweet hydrogenated starch hydrolysates, polymers of glucose, and other carbohydrates such as gum arabic, and other hydrocolloid gums, and mixtures thereof.

Hydrogenated starch hydrolysates are primarily prepared by the controlled catalytic hydrogenation of corn syrups. The resulting hydrogenated starch hydrolysates are mixtures of monomeric, dimeric, oligomeric, and polymeric saccharides. The ratios of these different saccharides give different hydrogenated starch hydrolysates different properties. The degree of polymerization (DP) of various hydrogenated starch hydrolysates is presented in Table 1.

Products high in percentages of monomer (DP1) and dimer (DP2) will have higher sweetness levels and produce softer confectionery products. Products high in percentages of polymers will have low sweetness and produce confectionery products that have a hard texture. DP-1, for example could stand for sorbitol, mannitol, xylitol or any other hydrogenated monosaccharide. DP-1 is generally sorbitol due to the natural abundance of glucose in the corn syrup starting material. Similarly, the percent DP-2 defines the amount of hydrogenated disaccharides such as maltitol present while DP-3, DP-4, DP-5 ... and so on define the amounts of higher hydrogenated saccharides present in the hydrogenated starch hydrolysate.

Preferably the hydrogenated starch hydrolysates used in the present invention will have a DP-1 value from about 5% to about 20%, a DP-2 value from about 5% to about 15% and a DP-3+ and DP-4+ value of up to about 90%. Most preferably, the hydrogenated starch hydrolysate will have a DP-1 value from about 10% to about 15%, a DP-2 value from about 5% to about 10%, and a DP-3+ and DP-4+ value of up to about 85%.

TABLE 1

| | Degree of Polymerization (DP) Value for Typical Hydrogenated Starch Hydrolysates | | | | | | |
|---|---|---|---|---|---|---|---|
| | DP-1 | DP-2 | DP-3 | DP 4+ | DP-3-DP-6 | DP-6+ | DP-3+ |
| Lycasin* | 6–8 | 50–55 | N.D.*** | N.D. | 20–25 | 15–20 | 35–45 |
| Hystar** HM-75 | 15 | 50 | 12 | 23 | | | 35 |
| Hystar 3375 | 14 | 18 | 10 | 58 | | | 68 |
| Hystar 4075 | 13 | 23 | 12 | 49 | | | 51 |
| Hystar 5875 | 7 | 60 | 11 | 22 | | | 33 |
| Hystar 6075 | 14 | 8 | 10 | 68 | | | 78 |

*Lycasin is a trademark of Roquette Corporation
**Hystar is a trademark of Lonza, Inc.
***Not determined Suitable polymers of glucose include randomly bonded condensation polymers of D-glucose. The polymers of glucose useful herein include those polymers disclosed in U.S. Pat. No. 3,766,165. Preferred polymers of glucose include the randomly bonded condensation polymer of D-glucose manufactured under the trademark POLYDEXTROSE by Pfeizer, Inc. and the condensation polymer of dextrose manufactured under the tradename PULLULAN by Hayashibara Biochemical Laboratories Incorporated, Okayama, Japan. Many polymers of glucose have no sweetness and some are low in calories. Accordingly inclusion of these polymers into the present compositions lowers the caloric content of the compositions.

In addition to the sweet carbohydrates, nonsweet carbohydrates may be employed.

The nonsweet carbohydrate bulking agent is employed in amounts of about 75% to about 25% by weight of the final granule and preferably from about 60% to about 40% by weight. The particle size of the bulking agent is critical in order to obtain the savory flavor which will exhibit both the proper organoleptic properties as well as physical attributes simulating conventional flavor. Particle sizes larger than about 100 mesh, U.S. standard sieve size, have been found acceptable in this invention with preferred sizes between about 35 and 60 mesh. Particle sizes passing through a 100 mesh sieve are too fine to be combined with the savory flavor and form unacceptable products that do not act like real flavor particles. In contrast particles larger than about 35 mesh sieve are too large. It should be recognized that the particular size of the bulking agent should be selected to meet the particular end use application. For example, "pretzel grade" flavor may be prepared with bulking agents having particle sizes that pass through a 35 mesh sieve (i.e., minus 35 mesh). "Shaker grade" products may be prepared from bulking agents having from minus 35 to plus 60 mesh materials. "Popcorn grade", size flavor may be prepared from bulking agent having minus 60 mesh particle sizes. Since the coated savory flavor forms agglomerates or clusters during manufacture, which may be smaller or larger than desired, it has been found advantageous to size classify such granules to obtain more desirable particle size distributions for such uses. Once sorted the final product should have less than about 10% of the granules which are finer than 100 mesh. All mesh sizes are by U.S. standard sieve size. The designation of a minus mesh size refers to material capable of passing through said mesh size screen whereas a plus mesh size refers to material being retained on said mesh size screen.

When the nonsweet bulking agent is prepared from sweet carbohydrates which are treated with a sweetener inhibitor, the inhibitor is employed in amounts of about 0.01% to about 0.5% and preferably 0.05% to about 0.2% by weight of the total weight of the nonsweet component, namely the combined weight of the sweet carbohydrate and inhibitor should equal 100%. For example if 0.14% of the inhibitor were employed with 49.86% bulking agent, the resulting composition represents use of 50% bulking agent in the formulations of this invention.

Savory flavors are generally considered nonsweet flavors, that is salty and/or spicy flavors, although savory flavors may contain sweet components. Suitable savory flavoring agents include natural and artificial food flavors such as spices, herbs, seasonings, vegetables, cooked meats, cooked fish and seafood, cheese, yeast, protein hydrolysates, and extracts of smoke, both individual and mixed. Such flavoring agents include liquid and solid forms. Nonlimiting examples of savory flavors include beef, pork, ham, poultry, cheddar, mozzarella, gouda, onion, garlic, tomato, pepper, paprika, nutmeg, coriander, yeast, soya, nuts, dried food ingredients, and the like. Preferred savory flavoring agents are pizza flavor, tomato flavor, cheese flavor, onion flavor, garlic flavor, bacon bits flavor, crouton flavor, cereal flavor, fried chip flavor, fried vegetable flavor, poultry, meat, and fish flavors, sour cream flavor, Mexican flavors and mixtures thereof. Mexican flavors include jalapeno, nacho, chile, tamale and Mexican spice flavors and mixtures thereof. A general discussion of savory flavors may be found in B. Dunstan, *Food,* February 1988 at pp. 43.46 and H. Heath, *Food,* February 1988 at pp. 20–23, which disclosures are incorporated herein by reference.

Flavoring agents include compounds which modify taste perception. Particularly useful taste modifiers include the food acids. Suitable acids include citric acid, malic acid, ascorbic acid, tartaric acid, lactic acid, sorbic acid, and mixtures thereof.

The amount of savory flavoring agent employed is normally a matter of preference subject to such factors as the type of flavor, the type of bulking agent, and the strength of flavor desired. In general, the flavoring agent is employed in the invention in amounts of about 25% to about 75% by weight of the final formulation, i.e., granule and preferably about 40% to about 60% by weight. The particle size of the savory flavor is critical when it is added in powdered form. Such particle size should be similar to the particle size of the bulking agent to prevent clumping of large flavor particles with relatively fine bulking agent particles. Sizes from about minus 35 mesh to plus 60 mesh are preferred with sizes of minus 100 mesh being unacceptable.

Salt may also be optionally included in the savory flavored nonsweet compositions of the present invention. Suitable salts include sodium chloride, potassium chloride, ammonium chloride and mixtures thereof. Sodium chloride is the preferred salt. Salts when used are generally present in amounts up to about 2% by weight, and preferably from about 0.1% to about 0.9%, by weight of the final product.

In the final formulation, the weight ratio of bulking agent to savory flavor is preferably 3:1 to 1:3.

The free-flowing savory flavored granules may be prepared by forming the non-sweet carbohydrate bulking agent if not already in nonsweet form, grinding or otherwise reducing the particle size to the desired particle size, blending the savory flavor with the bulking agent to achieve the desired flavor reduction and agglomerating, fusing, spray coating or otherwise attaching the flavor to the bulking agent and recovering the product.

One preferred process involves (a) forming a core particle comprising particulate nonsweet carbohydrate bulking agent having a particle size of plus 100 mesh, U.S. standard sieve size; (b) admixing a powdered savory flavor therewith to form a coated core; and (c) recovering a free-flowing flavored granule.

When preparing the flavor granule using powdered flavor it is advantageous to employ a granulating agent to aid in retaining the flavor agglomerates together. Such granulating agents are well known and include hydrocolloids which impart smoothness and body texture to the product. Granulating agents may be selected from a wide variety of water-soluble hydrocolloid agents. Useful hydrocolloids include natural and modified gums, modified celluloses, pectin, mucilages, modified starches, noncellulosic polysaccharides, algal polysaccharides and mixtures thereof. Particularly preferred hydrocolloids include carboxymethyl cellulose, methyl cellulose, karaya gum, acacia gum, sodium alginate, hydroxypropyl methyl cellulose and mixtures thereof. The hydrocolloids are present in amounts of about 0.25% to about 10% and preferably about 0.5% to about 5% by weight.

Another preferred process involves (a) forming a core particle comprising a particulate nonsweet carbohydrate bulking agent having a particle size of plus 100 mesh, U.S. standard sieve size; (b) spray coating the core particles with a solution of flavor to coat the core particles; (c) drying the coated particles and recovering a free-flowing flavored granule.

According to this procedure, the savory flavor is dissolved in the solution, preferably an organic solvent and sprayed into a fluidized bed of bulking agent. The solvent may contain any suitable concentration of flavor and may be employed in any suitable amount relative to the amount of bulking agent being coated. A preferred flavor concentration is from about 1% to about 40% flavor by weight in solvent. Suitable solvents include any food grade solvent which can dissolve the savory flavor and be volatilized once dried, leaving the flavor on the coated core. Exemplary solvents include ethanol, hexane, methanol and mixtures thereof and other non-toxic food grade solvents being useable.

The instant compositions may include materials selected from colorants, decolorants, oils, fats, preservatives, humectants, stickiness reducers, graining compounds, and so forth, and mixtures thereof, in varying amounts.

The colorants useful in the present invention are preferably water-soluble. A preferred colorant or dye includes materials suitable for food, drug and cosmetic applications, and are known as F.D.&C. dyes. A full recitation of all F.D.&C. colorants and their corresponding chemical structures may be found in the Kirk-Othmer Encyclopedia of Chemical Technology, 3rd edition, in Volume 6, at pages 561–595, which text is incorporated herein by reference. The colorants and dyes when used are generally present in amounts up to about 1%, by weight of the final composition, and preferably from about 0.01% to about 1%, by weight of the final composition.

Suitable preservatives include butylated hydroxyanisole (BHA), butylated hydroxytoluene (BHT), benzoic acid, ascorbic acid, methylparaben, propylparaben, ethylenediaminetetraacetic acid (EDTA), tocopherols and mixtures present in amounts up to about 1.0% by weight, and preferably from about 0.1% to about 1.0%, by weight of the final composition.

Suitable humectants include glycerin, sorbitol, fructose and mixtures thereof. Humectants when used are generally present in amounts up to about 5% by weight, and preferably from about 1.0% to about 5.0%, by weight of the final composition.

Suitable surface stickiness reducers include mono- and diglycerides, and distilled acetylated mono and diglycerides and mixtures thereof. The stickiness reducers when used are present in amounts up to about 1.0% by weight, and preferably from about 0.1% to about 1.0%, by weight of the final composition.

The present inventive savory flavored granules may be used as a substitute for conventional flavor in all applications that the conventional flavor would be employed. For example, shaker or table flavor, flavors to be used on other edible foods as well as flavors of various particle sizes, such as pretzel flavor and popcorn grade flavor. When the flavor is applied to edible food, it is simply applied like conventional flavor would be. The flavor granule clings or adheres to the food product the same way as conventional flavor.

The present invention is further illustrated by the following examples which are not intended to limit the effective scope of the claims. All parts and percentages in the examples and throughout the specification and claims are by weight of the final composition unless otherwise specified, based upon 100% total weight.

EXAMPLE 1

Flavor Granules

Part I. Sucrose Desweetening 1000 g sucrose was dissolved in 200 ml H2O and heated to 150° C. A desweetening agent in the amount of 1.4g, namely Lactisol (1.4 g) was added and mixed until uniformly dispersed to produce to nonsweet carbohydrate bulking agent. The nonsweet carbohydrate blend was spread on a slab and allowed to cool. Upon cooling to room temperature (about 24° C.) the mixture was ground in a blender and passed through a 45 mesh screen sieve, U.S. standard mesh size. The plus 45 mesh particles were without sweetness and were virtually tasteless and odorless.

Part II. Flavor Granule Preparation 475 g each of the desweetened sugar particles and flavor are combined. This mixture is agglomerated in a Glatt Uniglatt fluidized bed granulator under the following conditions:

1) Granulating Solution: 0.6% aqueous solution of hydroxypropyl methylcellulose
2) Spray Rate: About 25 ml/min intermittent to avoid overwetting
3) Inlet Air Temperature: 60°–70° C.
4) Inlet Air Flap Setting: 45
5) Spray Pressure: 1.5 bar After 300 ml granulating solution is applied to the agitated granules, they can be dried for 10 min. The granule's untapped bulk density would be around 0.54 while its particle size distribution would generally vary from

| | |
|---|---|
| on 16 mesh | less than 1 |
| through 16 on 20 mesh | about 5% |
| through 20 on 30 mesh | about 32% |
| through 30 on 45 mesh | about 41% |
| through 45 on 60 mesh | about 11% |
| through 60 mesh | about 10% |

When tasted, the particles would have an organoleptic taste of conventional flavor, and would exhibit physical properties similar to conventional flavor. Edible food tested with this substitute are considered indistinguishable from the same food treated with conventional flavor.

EXAMPLE II

Flavor Particle Prepared By Spray Coating

Part I: Sucrose Desweetening 1000 g sucrose was dissolved in 200 ml H2O and heated to 146° C. After cooling to 120° C. a desweetening agent in the amount of 1.4 g, namely Lactisol, was added and mixed until it became uniformly dispersed. The nonsweet carbohydrate blend was spread on a slab and cooled to room temperature (about 24° C). The mixture was broken into small pieces and ground in a blender. The particles that passed through a 50 mesh screen sieve, U.S. standard mesh size were selected. These fine particles were without sweetness and were virtually tasteless and odorless.

Part II: Flavor Granule Preparation 500 g of desweetened carbohydrate particles when placed in a Glatt Uniglatt fluidized bed coater/granulator can be sprayed with a 20% flavor in ethanol solution until a weight ratio of 2:1 desweetened carbohydrate/flavor is achieved. The conditions contemplated are:

1) Coating Solution: 20% w/w flavor in ethanol
2) Spray Rate: About 1–5 ml/min intermittent to avoid overwetting
3) Inlet Air Temperature: 90° C.
4) Inlet Air Flap Setting: 35
5) Spray Pressure: about 2 bar The coated particles would appear opaque when viewed under a stereomicroscope and should have sizes ranging from 0.5 cm diameter to less than 50 mesh.

The invention being thus described, it will be obvious that the same may be varied in many ways. Such variations are not to be regarded as a departure from the spirit and scope of the invention and all such modifications are intended to be included within the scope of the following claims.

We claim:

1. A free-flowing savory flavor granule which comprises:
   a) a core composition comprising a nonsweet carbohydrate; and b) a coating on the core comprising a flavoring material said core composition and said coating on the core being formed to produce a free flowing savory flavor granule.

2. The savory flavor granule of claim 1 which contains about 25% to about 75% nonsweet carbohydrate and about 75% to about 25% savory flavor.

3. The savory flavor granule of claim 1 wherein the nonsweet carbohydrate bulking agent is selected from the group consisting of nonsweet or low sweet hydrogenated starch hydrolysates, polymers of glucose, and other carbohydrates such as gum arabic, and other hydrocolloid gums, and mixtures thereof.

4. The savory flavor granule of claim 3 wherein the non-sweet carbohydrate bulking agent is a hydrogenated starch hydrolysate having a degree of polymerization value of 1 (DP-1) from about 5% to about 20%, a DP-2 value from about 5% to about 15%, and a DP-3 and DP-4 value of up to about 90%.

5. The savory flavor granule of claim 4 wherein the hydrogenated starch hydrolysate has a DP-1 value from about 10% to about 15%, a DP-2 value from about 5% to about 10%, and a DP-3 and DP-4 value of up to about 85%.

6. The savory flavor granule of claim 3 wherein the polymer of glucose is a randomly bonded condensation polymer of D-glucose.

7. The savory flavor granule of claim 1 wherein the nonsweet carbohydrate bulking agent is comprised of a sweet carbohydrate bulking agent and a sweetness inhibiting agent to nullify the sweetness of the bulking agent.

8. The savory flavor granule of claim 7 wherein the sweet carbohydrate bulking agent is selected from the group consisting of sugars, sugar alcohols, hydrogenated hexoses and hydrogenated pentoses, hydrogenated disaccharides, sweet hydrogenated starch hydrolysates and mixtures thereof.

9. The savory flavor granule of claim 7 wherein the sweet carbohydrate bulking agent is sucrose or a blend of sucrose and corn syrup solids in the ratio of about 0.5:1 to about 2:1.

10. The savory flavor granule of claim 7 wherein the sweet carbohydrate bulking agent is a sugar alcohol selected from the group consisting of sorbitol, xylitol, mannitol, galactitol, maltitol, and mixtures thereof.

11. The savory flavor granule of claim 7 wherein the sweet carbohydrate bulking agent is selected from the group consisting of hydrogenated hexoses, hydrogenated pentoses, and hydrogenated disaccharides, and mixtures thereof.

12. The savory flavor granule of claim 7 wherein the sweet carbohydrate bulking agent is a hydrogenated starch hydrolysate having a DP-1 value from about 5% to about 10%, a DP-2 value from about 15% to about 65%, and a DP-3 and DP-4 value from about 30% to about 70%.

13. The savory flavor granule of claim 7 wherein the sweetness inhibiting compound has the general formula:

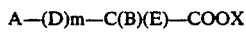

A—(D)m—C(B)(E)—COOX where m represents 0 or 1 and;
1) A represents a homocyclic or heterocyclic aromatic group;
2) B represents hydrogen or a 1-3 carbon aliphatic group or phenyl or,
3) when m represents O, A and B complete a homocyclic or heterocyclic aromatic group, or a methylidene group substituted by a homocyclic or heterocyclic aromatic group, and;
4) E represents hydrogen or alkyl or;
5) when m represents O, E represents hydroxy or alkoxy and;
6) D represents oxygen or sulfur, and;
7) X represents hydrogen or a physiologically compatible cation, or;
8) m represents 1 when A represents phenyl and B and C both represent hydrogen or;
9) when A represent unsubstituted phenyl, B represents alkyl and C represents hydrogen.

14. The savory flavor granule of claim 13 wherein the sweetness inhibiting agent is selected from the group consisting of 2-p-methoxyphenoxypropionic acid, p-methoxybenzylacetic acid, and mixtures thereof.

15. The savory flavor granule of claim 7 wherein the sweetness inhibiting agent is present in the sweet carbohydrate in amounts of about 0.01% to about 0.5% by weight so that the total weight of the sweet carbohydrate and inhibitor is 100%.

16. The savory flavor granule of claim 15 wherein the inhibitor is present in amounts of about 0.05% to about 0.2% by weight so that the total weight of the sweet carbohydrate and inhibitor is 100%.

17. The savory flavor granule of claim 1 wherein the granule additionally contains a material selected from the group consisting of colorants, decolorants, oils, fats, preservatives, humectants, stickiness reducers, graining compounds, and mixtures thereof.

18. The savory flavor granule of claim 7 wherein the nonsweet carbohydrate bulking agent is present in amounts of about 60 to about 40% by weight and the flavor is present in amounts of about 40% to about 60% by weight, all weights being of the final granule weight.

19. A method of flavoring an edible food product which comprises adding to the edible food product a savory flavor granule as defined in claim 1.

20. An edible food product which comprises an edible food and sprinkled thereon or adhered thereto the savory flavor granule as defined in claim 1.

21. A savory flavor granule of claim 1 wherein the savory flavor is selected from the group consisting of pizza flavor, tomato flavor, cheese flavor, onion flavor, garlic flavor, bacon bits flavor, crouton flavor, cereal flavor, fried chip flavor, fired vegetable flavor, poultry, meat, and fish flavors, sour cream and Mexican flavors such as jalapeno, nacho, chile, tamale and Mexican spice flavors and mixtures thereof.

22. A method for preparing a free-flowing savory flavor granule which comprises:
a) forming a core particle comprising particulate non-sweet carbohydrate bulking agents having a particle size of less than about 60 mesh, US standard sieve size;
b) admixing a powdered flavor therewith to form a coated core and
c) recovering a free-flowing savory flavor granule.

23. The method of preparing the savory flavor granule of claim 22 wherein the nonsweet carbohydrate bulking agent is selected from the group consisting of nonsweet or low sweet hydrogenated starch hydrolysates, polymers of glucose, and other carbohydrates such as gum arabic, and other hydrocolloid gums, and mixtures thereof.

24. The method of preparing the savory flavor granule of claim 22 wherein the powdered flavor is mixed with the bulking agent in the presence of a granulating agent.

25. The method of claim 24 wherein the granulating agent is selected from the group consisting of synthetic cellulose, synthetic starches and mixtures thereof.

26. The method of claim 22 wherein less than about 10% of the granules are finer than 100 mesh, US standard sieve size.

27. The method of claim 22 wherein the weight ratio of carbohydrate to savory flavor is from about 3:1 to 1:3 percent by weight.

28. The method of claim 22 wherein the flavoring agent is selected from the group consisting of pizza flavor, tomato flavor, cheese flavor, onion flavor, garlic flavor, bacon bits flavor, crouton flavor, cereal flavor, fried chip flavor, fired vegetable flavor, poultry, meat, and fish flavors, sour cream flavor and Mexican flavors such as jalapeno, nacho, chile, tamale and Mexican spice flavors and mixtures thereof.

29. The method of preparing the savory flavor granule wherein the non-sweet carbohydrate is comprised of a sweet carbohydrate and a sweetness inhibiting agent to nullify the sweetness of the bulking agent.

30. The method of preparing the savory flavor granule of claim 29 wherein the sweet carbohydrate is selected from the group consisting of sugars, sugar alcohols, hydrogenated hexoses, hydrogenated disaccharides, sweet hydrogenated starch hydrolysates and mixtures thereof.

31. The savory flavor granule of claim 29 wherein the sweetness inhibiting compound has the general formula:

A—(D)m—C(B)(E)—COOX where m represent 0 or 1 and;
1) A represents a homocyclic heterocyclic aromatic group;
2) B represents hydrogen or a 1-3 carbon aliphatic group or phenyl or,
3) when m represents O, A and B complete a homocyclic or heterocyclic aromatic group, or a methylidene group substituted by a homocyclic or heterocyclic aromatic group, and;
4) E represents hydrogen or alkyl or;
5) when m represents O, E represents hydroxy or alkoxy and;
6) D represents oxygen or sulfur, and;
7) X represents hydrogen or a physiologically compatible cation or;
8) m represents 1 when A represents phenyl and B and C both represent hydrogen or;
9) when A represents unsubstituted phenyl, B represents alkyl and C represents hydrogen.

32. The method of preparing the savory flavor granule of claim 31 wherein the sweetness inhibiting agent is selected from the group consisting of 2-p-methoxyphenoxypropionic acid, p-methoxybenzylacetic acid, and mixtures thereof.

33. A method for preparing a free-flowing savory flavor granule which comprises:
a) forming a core particle carbohydrate bulking agent having a particle size of plus about 100 mesh, US standard sieve size;
b) spray coating the core particles with a solution of flavor to coat the core particles; and
c) drying the flavor coated particles and recovering a free-flowing savory flavor granule.

34. The method of preparing the savory flavor granule of claim 33 wherein the nonsweet carbohydrate is selected from the group consisting of nonsweet or low sweet hydrogenated starch hydrolysates, polymers of glucose, and other carbohydrates such as gum arabic, and other hydrocolloid gums, and mixtures thereof.

35. The method of preparing the granule of claim 33 wherein the non-sweet carbohydrate is comprised of a sweet carbohydrate bulking agent and a sweetness inhibiting agent to nullify the sweetness of the bulking agent.

36. The method of preparing the savory flavor granule of claim 35 wherein the sweet carbohydrate bulking agent is selected from the group consisting of sugars, sugar alcohols, hydrogenated hexoses, hydrogenated disaccharides, sweet hydrogenated starch hydrolysates and mixtures thereof.

37. The savory flavor granule of claim 35 wherein the sweetness inhibiting compound has the general formula:

A—(D)m—C(B)(E)—COOX where m represents 0 or 1 and;
1) A represents a homocyclic or heterocyclic aromatic group;
2) B represents hydrogen or a 1-3 carbon aliphatic group or phenyl or,
3) when m represents O, A and B complete a homocyclic or heterocyclic aromatic group, or a methylidene group substituted by a homocyclic or heterocyclic aromatic group, and;
4) E represents hydrogen or alkyl or;
5) when m represents O, E represents hydroxy or alkoxy and;
6) D represents oxygen or sulfur, and;
7) X represents hydrogen or a physiologically compatible cation, or;
8) m represents 1 when A represents phenyl and B and C both represent hydrogen or;
9) when A represents unsubstituted phenyl, B represents alkyl and C represents hydrogen.

38. The method of preparing the savory flavor granule of claim 37 wherein the sweetness inhibiting agent is selected from the group consisting of 2-p-methoxyphenoxypropionic acid, p-methoxybenzylacetic acid, and mixtures thereof.

39. The method of claim 33 wherein the solution contains about 10% to about 40% flavor.

40. The method of claim 33 wherein less than about 10% of the granules are minus 100 mesh, US Standard sieve size.

41. The method of claim 33 wherein the weight ratio of carbohydrate to flavor is from about 3:1 to 1:3 percent by weight.

42. The method of claim 33 wherein the flavoring agent is selected from the group consisting of pizza flavor, tomato flavor, cheese flavor, onion flavor, garlic flavor, bacon bits flavor, crouton flavor, cereal flavor, fried chip flavor, fried vegetable flavor, poultry, meat, and fish flavors, sour cream flavor and Mexican flavors such as jalapeno, nacho, chile, tamale and Mexican spice flavors and mixtures thereof.

* * * * *